United States Patent Office 3,804,733
Patented Apr. 16, 1974

3,804,733
METHOD AND APPARATUS FOR THE ELECTRO-CHEMICAL REMOVAL OF METAL IONS
Douglas N. Bennion, Sepulveda, and John S. Newman, Kensington, Calif., assignors to The Regents of the University of California
Filed Jan. 2, 1973, Ser. No. 319,993
Int. Cl. C02c 5/12
U.S. Cl. 204—151                          13 Claims

ABSTRACT OF THE DISCLOSURE

A pair of opposed inert, porous, electrically conducting electrodes, preferably composed of inexpensive flakes and chips of carbon, are provided with a potential difference therebetween so that one (the anode) is positive relative to the other (the cathode). The porous anode is also provided with copper in ionizable form. A solution to be purified is passed through the cathode while an electrolyte, possibly a portion of the same solution or a mixture thereof, is passed through the anode whereby solutions in the cathode and anode are electrolyzed (becoming catholyte and anolite, respectively) causing removal of metal ions more noble to hydrogen in the electromotive series from the catholyte and an addition of at least copper to the anolyte to provide a purified effluent from the cathode and an enriched effluent from the anode. Upon saturation of the cathode with the accumulated deposited metal ions, the cell is regenerated by continued operation with the potential to the electrodes reversed and the feed solution to the cell reversed so that the role of the electrodes is reversed.

BACKGROUND OF THE INVENTION

Metals such as copper are becoming prohibitively expensive due to natural shortages and the expense involved in recovery, transportation, and purification. At the same time, many industrial waste streams contain metal ions, including copper, which are toxic to plant and animal life even at concentrations of the order of 1 microgram per milliliter (ug./ml.—the letter "u" is used in all places herein for the Greek letter "mu," the symbol for microgram). For example, copper is toxic to trout at the 0.14 ug./ml. level. Mercury, lead, arsenic and cadmium are other examples of metallic ions which are toxic to plant and animal life at very low levels. It is especially important that toxic agents in industrial waste streams be eliminated.

The present invention provides method and apparatus for removing metal ions which are close to or more noble than hydrogen in the electromotive series, such as, but not limited to cadimum, zinc, copper, mercury and silver, from solutions carrying even low concentrations; e.g., 1 to 1000 ug./ml. to provide a highly purified effluent and also, if desired, concentrating at least one of these metals in a highly enriched effluent. The invention is particularly applicable to removal of copper and providing a solution highly enriched in copper so that it can easily be recovered. Since copper is of such interest and the invention is so eminently suitable for its removal and recovery, the discussion which follows emphasizes this aspect without intending limitation.

A number of methods for removing copper ions from solution have been proposed. In one, the copper is exchanged for iron by running the waste stream through a packed bed of iron. The effluent is, thus, enriched with iron. The mass transfer of copper ions to the iron surface and transfer of iron ions from the surface is impeded as a layer of copper forms on the iron, and the spent bed (mixed copper and iron) must be mechanically removed and new iron put in periodically. A second method is to increase the pH of the waste stream above 7 by adding calcium oxide or other base and precipitating hydrated copper oxide. The floc must then be settled, concentrated, and the copper recovered using standard sludge handling procedures. A third technique is to run the waste stream through a fixed bed of ion exchange resin. This method has been used successfully to recover uranium, gold, platinum, mercury, and chromates. Resins are now becoming available for removing copper. However, the resins constitute a major contribution to the capital cost, and in some cases the spent resin cannot be regenerated. A fourth technique is to plate copper electrochemically onto particles in a fluidized bed. Again, however, one is faced with the problem of replacing or regenerating a spent bed with a method which is practical.

It has been suggested that a solution to be purified be passed through a porous electrode of an electrolytic cell [see U.S. Pat. 3,459,646, Carlson and George W. Heise, "Porous Carbon Electrodes" Transactions Electrochemical Society, 75, 147–166 (1939)]. This approach appears to be most promising and indeed the present invention utilizes such electrodes. However, the previously suggested arrangements do not accomplish the results desired in one or more of a number of respects. For example, a continuous process is not provided; i.e., the process must be stopped for operations such as electrode regeneration. Further, direct continuous transfer of the desired metal (e.g. copper) is not provided.

OBJECTS AND SUMMARY OF THE INVENTION

It is an object of this invention to provide method and apparatus for removing metal ions close to or more noble than hydrogen in the electromotive series from solution to deliver a purified effluent.

It is an object of the invention to provide apparatus and method for treating a given solution and providing an effluent solution which is highly enriched in at least one metal of the group of metals more noble to hydrogen in the electromotive series.

It is another object of the invention to provide apparatus and method for simultaneously carrying out both of the above objects.

It is a further object of the invention to provide method and apparatus for carrying out the above objects in a continuous fashion.

In carrying out the present invention, metal ions of the group close to or more noble than hydrogen in the electromotive series are removed from solution to provide a purified effluent and at least one metal ion of the group—in a preferred embodiment, the metal copper—is transferred to a second solution to provide a second effluent which is enriched by introducing solution between a pair of porous flow through electrodes which are fixed in spaced relation so that two separate solution paths are provided; one through each one of the pair of electrodes. An electromotive force is applied to the other and thus, the electrodes become anode and cathode of an electrolytic cell and the solutions flowing through the anode and cathode, respectively, are considered anolyte and catholyte. The solution to be purified is passed through the porous cathode which removes metal ions of the group close to or more noble than hydrogen in the electromotive series whereby the cathode effluent is purified. The anolyte simultaneously passes through the porous anode which is enriched in the metal to be transferred to the anolyte, preferably copper, and electrolytic action causes transfer of the metal ion to the anolyte whereby the anode effluent is enriched. When the cathode becomes clogged, as indicated by increased back pressure, the role of the electrodes is reversed by reversing polarity of the applied electromotive force, and, if separate solutions are applied to the anode and cathode, they are rerouted for proper flow so that continuous operation is achieved with the single cell.

The novel features which are believed characteristic of the invention are set forth with particularity in the appended claims. The invention itself, however, both as to its organization and method of operation together with further objects and advantages thereof, may best be understood by reference to the following description taken in connection with the accompanying drawings in which:

DESCRIPTION OF THE PREFERRED EMBODIMENTS

In its most immediate application, the overall function of the apparatus and method of the invention is to concentrate copper ions in solution and remove unwanted metal ions (impurities) from solution. More broadly, however, the function of the apparatus and method is to remove metallic ions of the group close to or more noble than hydrogen in the electromotive series from a solution and provide a concentration of at least one metal from the group in solution. Since the main thrust of the illustrated system is directed to concentration of copper ions, the description is oriented toward this application but the invention is not so limited.

In order to obtain a clear understanding of the general method of operation, fluid flow sequences, and electrical connections, the invention is first described in connection with the diagramatic view of FIG. 1 in which the electrolytic cell 10 is not shown in great detail and is described only briefly. Detailed structure of electrolytic cells which are designed to carry out the separation and concentration functions of the invention are subsequently described in more detail in connection with FIGS. 2 and 3.

The feed for the purifying and copper concentrating cell 10 might, for example, be leaching solution from an ore pile or mine runoff waters. In the illustration the soluiton to be purified is brought in from a cathode feed container 12 (top left and portion of the illustration). The solution from cathode feed container 12 flows out through cathode feed pipe or line 14, a throttle valve 16 in the line which is provided to control the rate of flow of solution therein and into the electrolytic cell 10 through one of a pair of "on-off" valves 18 and 20 which are provided in cathode inlet pipes 22 and 24, respectively, of the cell 10 (bottom of the cell in the illustration).

After the cathode feed solution is purified in the cell, as is described below, it flows out one of the two cathode solution outlet pipes 26 and 28 (top of cell 10 in figure). Which of the two cathode solution outlet pipes is open to fluid flow is determined by the state of two "on-off" valves 30 and 32 which are provided in the outlet pipes 26 and 28, respectively, and the open valve is selected so that fluid flow is continuous up through one side (left or right in the illustration) of the cell 10. The purified cathode product solution next flows through a single outlet pipe 34 which is connected to deliver the output of either of the cell cathode solution outlet pipes 26 and 28 to a lean leach solution or cathode product container 36 for disposal. Actually, the purified solution is pure enough to be disposed of directly in a stream as toxic metallic ions will have been removed by the treatment. In the illustration, a further throttle valve 38 is provided in the outlet pipe 34 to give a finer control over the rate of flow of the solution in the purification cycle. Also, a reference electrode 40 is provided in the outlet pipe for assisting in electrical control of the cell 10.

Having considered the general flow of the rich leach solution to be purified from the inlet container 12, through the electrolytic cell 10 where it is purified and disposed of in the lean leach solution container 36, now consider the general flow of the solution which is enriched in the process. For convenience, FIG. 1 is arranged so that the flow of the solution being purified is generally shown at one side (the left side) of the illustration and the general flow arrangements of the solution to be enriched is shown at the other (the right) side. Thus, a lean electrowin or anode feed container 42 is shown at the upper right side of the drawing.

The solution to be enriched, that is held in anode feed container 42, may or may not contain the desired metal copper. It may be the same solution as that contained in the cathode feed container 12, a pure electrolyte solution, or depleted electrowinning solution from an electrowinning cell, for example. The feed solution path is followed from the feed solution container 42 out through anode feed pipe or line 44, a throttle valve 46 in the line 44 which is provided to control the rate of flow of solution from the container 42 and into the top of electrolytic cell 10 through one of a pair of "on-off" valves 48 and 50 which are provided in anode inlet pipes 52 and 54, respectively.

After the lean feed solution is enriched in the cell 10, as is fully described subsequently, the enriched solution flows out one of two anode solution outlet pipes 56 and 58 (bottom of cell 10 in FIG. 1). Which of the two enriched solution outlet pipes is open to receive the enriched solution is determined by the state of two "on-off" valves 60 and 62 which are provided in the outlet pipes 56 and 58, respectively, and the open valve is selected so that fluid flow is continuous down through one side (left or right) of the cell 10. The enriched effluent flows through a single outlet pipe 64 which is located to deliver the output of either of the cell output pipes 56 or 58 to an enriched effluent container (also called enriched electrowin solution container or anode product solution container) 66.

The enriched effluent may, of course, be delivered dirictly for recovery in any one of the conventional recovery systems. For example, the copper can be recoverd in an electrowinning cell or other copper reduction process. In the illustration, another throttle valve 68 is provided in effluent outlet pipe 64, to give additional control over the rate of flow of the solution in the enrichment cycle. Other refinements may be made in the fluid flow systems which may be helpful but are not necessary. For example, flow meters in both the purified and enriched solution outlet pipes 34 and 64, respectively, would be convenient in monitoring operation of the cell 10, but are not essential.

Figure 1:
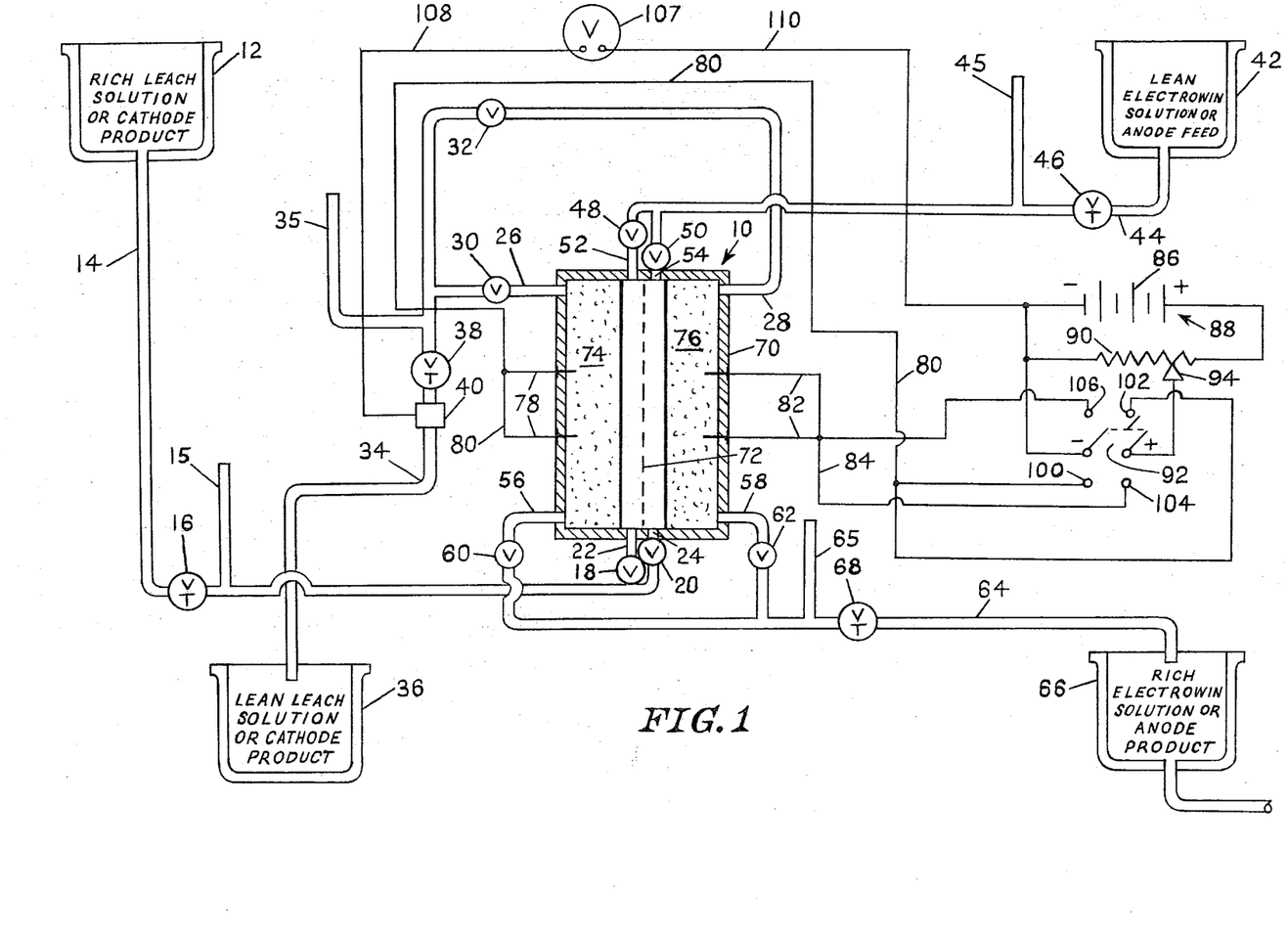
FIG. 1 is a diagramatic view of an electrolytic cell and its attendant electrical and fluid flow connections used in carrying out the invention in one embodiment.

The electrolytic cell 10, as illustrated in FIG. 1, must perform both its electrical functions and also function as a guide for fluid flow. In order to perform as a fluid guide, the cell 10 has an outer container 70 which is fluid tight except for the inlet and outlet pipes already described and further it is divided into two compartments (left half from right in the illustration) by a membrane 72 which extends down the center and prevents mixture of the solutions on opposite sides. It will be noted that the membrane 72 is located between the two cell cathode feed inlet pipes 22 and 24 (at bottom) and also between the two cell anode feed inlet pipes 52 and 54 (at top). Thus, by proper disposition of the "on-off" valves 18 and 20 in the cathode solution feed pipes 22 and 24 and "on-off" valves 48 and 50 in the anode solution feed pipes 52 and 54, the anode and cathode feeds can be made to enter the cell container on opposite sides of the dividing membrane 72 and the solutions will not mix since they will not flow across the membrane 72.

The electrical functions of the cell 10 are performed by two opposed and spaced apart, porous, electrically conductive, flow through electrodes 74 and 76 which are separated by the membrane 72 so that they are effectively located in separate compartments (left and right, respectively, as illustrated) as far as fluid flow in the cell is concerned. Electrical connections are provided to the porous electrode 74 on the left side by two conductive leads 78 which insulatively extend through the cell container 70. The two leads are provided to distribute effectively the electrical connection to the electrode 74. Both leads 78 are connected to a common electrical bus 80. In like manner, the opposite electrode 76 is provided with a pair of conductive lead wires 82 which extend through the cell container 70 and are connected to another electrical bus 84 for energization.

The power supply for the cell 10 must be direct current or unidirectional and capable of being reversed to reverse the potential applied to the electrodes 74 and 76 since the system is reversible for continuous operation. That is, the system is reversible in the sense that for part of the purification and copper concentration cycle, one of the two electrodes 74 and 76 is made positive relative to the other so that one, say electrode 74, is a cathode (negative) and the other, in this case electrode 76 is positive and an anode. Then upon completion of a full cycle as evidenced by a loading of the cathode with metal ions, the role of the electrodes is reversed by reversing the potential applied to them. Aside from meeting these requirements the particular voltage supply used is not critical.

As illustrated, the voltage for the system is supplied by a battery 86. In order to provide a variable voltage to the system, a potentiometer 88 is connected across the terminals of the battery 86. That is, the resistor 90 of the potentiometer 88 is connected directly between the positive and negative terminals of the battery 86. One arm of a double pole double throw switch 92 is connected directly to the negative side of the battery 86 and the other arm is connected to a variable tap 94 on the resistor 90 of the potentiometer 88. Thus a variable but direct current potential is applied between the throw arms of the switch 92.

The electrical bus 80 which is connected to the electrode 74 (left) of the cell is connected to lower left terminal 100 and to the upper right terminal 102 of the switch 92; and the bus 84 which is connected to the opposite cell electrode 76 is connected to the lower terminal 104 on the right, and to the upper terminal 106 on the left. Thus, with the arms of the switch in the upper position, upper left hand terminal 106 and the cell electrode 76 (right) which is connected thereto are negative, and at the same time the upper right hand switch terminal 102 and the cell electrode 74 are positive. For this switch position then, cell electrode 76 on the right is cathode and the other cell electrode 74 (left) is anode. When the arms of the switch are in the down position (in contact with lower terminals 100 and 104) the potential of the cell electrodes 74 and 76 is reversed, i.e., the electrode 74 on the left is the cathode and the opposite electrode 76 is the anode.

In order to obtain a better understanding of how the system operates, consider the condition with the arms of supply switch 92 in the lower position. Thus, the cell cathode is the left electrode 74 and the opposite electrode 76 (right) is the anode. Under these conditions, the cathode feed solution is applied to the inside of the cell 10 to the cathode side of the separating membrane 72. In order to accomplish this, the throttle valve 16 in cathode solution feed line 14 must be open as well as "on-off" valve 18 in the cell inlet pipe 22 which is to the left of the separating membrane 72. At the same time the valve 20 in the other cell inlet pipe 24 which is also connected to the cathode solution feed line 14 is closed to prevent the solution from flowing into the cell 10 on the anode side (electrode 76) of separator membrane 72.

An outlet is provided for the cathode feed solution by opening the "on-off" valve 30 in the cathode outlet pipe 26 which is at the upper left of the cell 10 as illustrated and on the opposite side of the flow through porous cathode 74 from the inlet pipe 22. Thus, effluent from the cathode side of the cell 10 must flow through the cathode 74. The cathode feed solution in the cathode 74 and immediately surrounding it is called catholyte since it is an electrolyte in the influence of the cathode. To insure integrity of the system, the cathode solution exit pipe 28 on the anode side of the cell 10 is closed by means of the "on-off" valve 32 therein.

Even with the voltage applied to the electrodes 74 and 76 of the cell 10, the apparatus is not active until the cell, including the anode side, is provided with electrolyte. This is accomplished by providing open passage through the anode solution feed pipe 44, throttle valve 46 therein, and the "on-off" valve 50 in anode solution inlet pipe which feeds into the top of the cell 10 on the anode side (right) of the separator membrane 72. Entry of the anode feed solution into the cathode side of the membrane is avoided by closing the valve 48 in the anode inlet pipe 52 which enters the cell 10 immediately on the other (now cathode) side of separator membrane 72. A flow path is provided from the anode solution inlet pipe 54, through the anode 76 and through the anode effluent outlet pipe 58 by opening the "on-off" valve 62. With the throttle valve 68 in anode outlet pipe 64 open, the anode product solution has a clear flow path to the anode product container 66. The "on-off" valve 60 in the anode product solution outlet pipe 56 must be closed to prevent catholyte from draining since the outlet pipe 56 is in the cathode side of the cell 10 under the feed condition prevailing. The electrolyte solution occupying the porous anode 76 and immediately surrounding it is called anolyte.

For initial operation, the electrode which is to be the anode (here electrode 76) must have a quantity of copper powder in the porous electrode to allow continuous copper dissolution during the first cycle. The particle size of the powder is not important, but it should be less than about 1 mm. The amount of copper added should be sufficient so that the cathode becomes plugged before the copper in the anode is consumed. In practice, the cathode became plugged when 1.6 pounds of copper had been deposited per square foot of frontal area of the cathode. Thus, approximately two pounds of copper per square foot should be mixed in the porous anode initially. Adding two or three times this amount of copper would not be detrimental to the cell operation and would insure that the anode would not limit the cell cycle life.

With anolyte flowing through the copper loaded anode 76, catholyte solution flowing through the cathode 74, and operating potential applied, all as described above, the device becomes operative. Copper ions and other ions close to or more noble than hydrogen are removed from the catholyte as it flows through the cathode 74. The effluent or discharge from the cathode 74 contains only the original impurities and ions which are less noble than hydrogen such as ferric, ferrous, zinc, manganese, etc., depending on the pH and VDP setting. The copper ions remain in the cathode 74, being plated out as copper. The noble metals such as gold, silver, and platinum are also plated out with the copper.

The anolyte flows through the porous anode 76, and copper ions are added to the anolyte. The effluent from the anode is, thus, enriched in copper ions as compared to the anode feed. The anode product solution as collected in the anode product container 66 may be increased up to the saturation point of the copper ions at the operating temperature of the cell 10. Noble metals in the anode 76 remain in the anode, that is, the noble metals accumulate in the cell 10 with time.

When the cathode 74 becomes full of copper, as evidenced by a high pressure thereacross, the function of the electrodes 74 and 76 must be reversed and the flow of the solutions must be changed from one side of the cell 10 to the other. The function of the electrodes 74 and 76 is reversed by moving the arms of control switch 92 from the lower contacts 100 and 104 to the upper position so that the positive arm is connected directly to electrode 74 via bus 80 and the negative arm is connected to the other electrode 76 via bus 84. With these polarities, then, the cell electrode 74 on the left is the anode and the opposite electrode 76 (on the right) is the cathode.

With the function of the cell electrodes reversed, the flow of cathode and anode feed solutions to the cell halves is exchanged in the illustrated embodiment by simple "on-off" valves. It is, however, within the contemplation of the invention to gang the valves and control switch 92 so that reversal of electrical and solution flow connections take place simultaneously. Specifically, the cathode feed solution flow is transferred from the side of cell 10 to the left of the separating membrane 72 to the other side by closing the "on-off" valve 18 in the cathode feed inlet pipe 22 to the left of the membrane 72 and the corresponding "on-off" valve 30 in the outlet pipe 26 for cathode effluent and simultaneously opening the cathode feed inlet pipe 24 which feeds the cell 10 on the right side of separating membrane 72 (bottom) by opening the "on-off" valve 20 therein and also opening the cathode product outlet pipe 28 in the right hand side of the cell by opening its "on-off" valve 32. At the same time, valves 50 and 62 in anode feed 54 and exit 58 lines should be closed, and valves 48 and 60 in the feed 52 and exit 56 lines should be opened. Thus, anode feed solution now flows in inlet pipe 52 at the top of the cell 10, through the electrode 74 (now anode), and out outlet pipe 56 at the lower left. Cathode feed solution flows in the bottom of cell 10 to the right of separator membrane 72 by way of inlet pipe 24 which is connected at this location, through the new cathode electrode 76 (right) and out the upper outlet pipe 28 to the right.

As previously indicated, switching of electrode functions is dictated by the occurrence of high pressure drop (order of 3 feet of water pressure) across the cathode. In order to provide a means of ascertaining this pressure, stand pipes 15 and 35, respectively, are provided in the cathode feed pipe 14 and outlet pipe 34. The fluid level differential between these two stand pipes (15 and 35) give the desired measure. By also providing stand pipes 45 and 65, respectively, in anode feed and outlet pipes 44 and 64, the pressure difference across both electrodes 74 and 76, across the separator membrane 72 and the internal cell pressure can all be determined.

The throttle valves 16 and 38 in the cathode feed inlet and outlet pipes 14 and 34, respectively, and throttle valves 46 and 68 in anode feed and outlet pipes 44 and 64, respectively, provide a means of controlling the flow rate through the electrodes 74 and 76, the pressure difference across the separator membrane 72, and the internal cell pressure. These valves may be operated manually or they may be automatic. For example, the inlet throttle valves 16 and 46 may be set to maintain automatically fixed pressures downstream as can the outlet throttle valves 38 and 68. Alternatively, the feed containers 12 and 42 can be located to provide fixed predetermined pressures at the cell inlet pipes 22, 24, 52 and 54 and thereby eliminate some of the control valves.

The flow paths and rates and electrical parameters (voltages and currents) are determined by a number of design principles and considerations. First, in order to effect substantial reduction in the amount of copper in the catholyte flowing stream, there must be intimate contact between the solution and the cathode. This criterion is met by providing the porous flow through electrodes 74 and 76 and operating them so that the copper ion concentration next to the carbon approaches zero, i.e., operating near the limiting current. In addition, the required reduction of copper in the catholyte, e.g., from 667 ug./ml. of 1 ug./ml., determines the required thickness of electrodes in the direction of flow. Further, in order to have a high current efficiency, the flow rate must be adjusted so that hydrogen evolution does not occur in the cathode. The ohmic potential drop within the flow solution must be maintained below a certain value to insure that the desired reaction alone is carried out.

In the system illustrated, the potential within the catholyte effluent flow solution is monitored by connecting one terminal of a voltmeter 107 directly to the reference electrode 40 in the cathode effluent pipe 34 via lead 108 and the other terminal directly to the negative terminal of battery 86 (the potential of the cathode) via conductor 110. Since the voltmeter 107 reads the potential difference between the catholyte product stream and the cathode, the voltage registered is defined as the voltage of dilute product VDP. The electrolytic cell 10 is controlled electrically based on the voltage VDP. The specific electrode used in the equipment illustrated is a saturated calomel electrode; however, any reference electrode reversible to one of the ions in the catholyte product or connected to the catholyte effluent flow solution by a liquid junction may be used. While the cell 10 is controlled based on the voltage VDP, the control is accomplished by varying the position of the arm 94 on control potentiometer 88 thereby to vary the voltage applied between the cell anode and cathode (VA). The more positive the applied voltage VA the more positive VDP becomes (the reverse is also true).

The more positive the voltage VDP, the closer is the approach to limiting current within the cathode and the more effective the removal of copper. Also, the more positive the voltage VDP, the closer the cathode comes to evolving hydrogen. The optimum setting for the voltage VDP is as positive as possible without causing hydrogen evolution. This point will be discussed in more depth in connection with the graph of FIG. 4. In general, the larger the voltage VDP, the smaller the copper ion concentration in the catholyte effluent. Conversely, the lower the voltage VDP, the higher the catholyte effluent concentration. If a higher flow rate is desired for a given cathode feed copper ion concentration. VDP must be increased to maintain the same catholyte effluent concentration. When VDP is already at the hydrogen evolution potential, further increase in flow cannot be further compensated by increase in VDP, and either a higher catholyte concentration must be tolerated or hydrogen evolution must be tolerated. Similarly, if the input concentration is increased or the flow rate increased, and if VDP cannot be adequately increased, that is, if higher copper removal rates are desired, a larger effluent catholyte copper ion concentration must be tolerated.

Cell operation is quite insensitive to anolyte flow rates so long as natural convection is properly controled. The lower the flow, the higher the effluent analyote copper ion concentration. The effluent anolyte copper ion concentration must not exceed saturation or else precipitation and plugging will occur within the anode.

Figure 2:
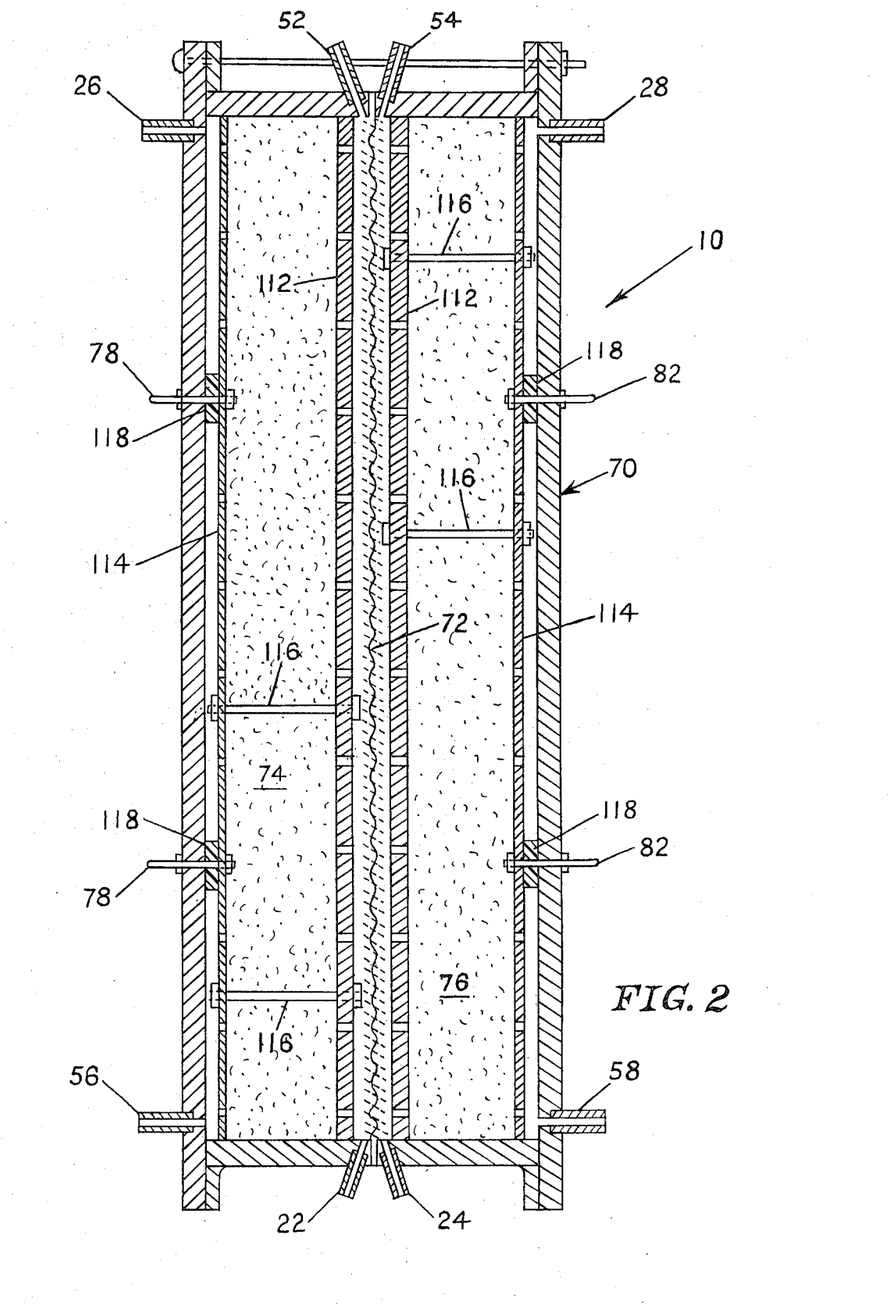
FIG. 2 is a side elevational view, in cross section, of one embodiment of an electrolytic cell, the one diagramatically illustrated in connection with FIG. 1.

A more detailed view of the electrolytic cell 10 used in the system is given in FIG. 2. For the sake of simplifying the drawings, the elements of the cell 10 that are shown in FIG. 1 are given the same reference numerals in both figures. Further, the description is simplified by only describing those elements of the cell which have not already been described in connection with FIG. 1 For example, it has already been pointed out that the cell 10 is housed in an outer container 70 which is fluid tight except for inlet pipes 22, 24, 52 and 54 and the outlet pipes 26, 28, 56 and 58. It is believed that these elements need no further description. On the other hand, details of the structure of porous flow through electrodes 74 and 76 as well as their support elements are further described. It is also believed that characteristics of the separator membrane 72 and the method of making electrical connections to the electrodes bear some elucidation.

As already noted, the separator membrane 72 extends through the center of the cell container 70 separating the porous electrodes 74 and 76 as well as the two cathode feed inlet pipes 22 and 24 (at bottom) and the two anode feed pipes 52 and 54 (at top). The separator membrane 72 is provided to prevent mixing of the catholyte and anolyte. The anolyte is, in general, more dense than the catholyte, and hence, tends to flow by natural convection into the bottom of the cathode and decrease the separation which can be achieved. The separator membrane 72 between the two electrodes 74 and 76 effectively confines anolyte and catholyte to the area of their respective electrode. In its simplest form, the separator 72 may be simply an inert, porous mat or sheet such as nonwoven polypropylene cloth. In which case, the pressure on the catholyte side of the membrane must be higher than on the anolyte side so that a forced convection flow takes place through the membrane from catholyte to anolyte. The forced convection flow must be of sufficient magnitude to prevent the adverse natural convection flow. In addition, the forced convection flow prevents the adverse diffusion of copper ions from the anolyte to the catholyte; however, a very small flow, in the order of diffusion velocities, is sufficient to prevent the adverse diffusion.

The mixing of catholyte into the anolyte may decrease the efficiency of some separation operation applications. Thus, semipermeable membranes may be preferable to simple cloth or paper type separators. The semipermeable membranes have more resistance to convective flows, and a lower forced convection flow of catholyte to anolyte will be effective in preventing the adverse natural convection flow. Membranes of cellulose, cellulose acetate, or nylon derivatives may be used. In particular, an anion exchange membrane with a polyethylene or polypropylene backbones is described for this conception. Anion exchange membrane with fluorocarbon backbones or other structures may also be used. The anion exchange membrane prevents, at least to a large extent, the mixing or diffusion of copper cations from one compartment to the next since cations are excluded from the anion exchange membrane. The electrical current is carried across the anion exchange membrane by the anions, in particular by sulfate ions, for example. Since the usually available commercial anion exchange membranes are not perfect or complete in excluding cations, a small pressure difference, for example one or two inches of water, across the membrane is desirable. The slightly higher pressure on the catholyte side further reduces the diffusion or convection transport of copper ions from anolyte to catholyte.

Next consider the porous electrodes 74 and 76 which may be any inert, porous, electrically conducting material. The electrodes in FIG. 2 are composed of a granular mixture of graphite and carbon (typically 4 percent retained on a 20-mesh sieve, 22 percent retained on a 30-mesh sieve, 47 percent retained on a 50-mesh sieve, 16 percent retained on a 65-mesh sieve, and 11 percent passing a 65-mesh sieve). Since the main composition of the two electrodes is granular and not capable of self support, a means should be provided to contain and support the material. To this end, each of the electrodes is provided with a perforated front plate 112 adjacent to the separator membrane 72, and an opposing perforated back plate 114 adjacent but spaced from the outer cell container walls. The plates extend from the top to the bottom of the container and the front and back plates 112 and 114 of each electrode, respectively, are held together by conventional tie rods 116.

The front plates 112 can be any perforated or porous, nonconducting material inert to the solution and having sufficient mechanical strength to retain the granular carbon. Materials such as coated wood, and many plastics, for example polyvinyl chloride, may be used. An inert filter mat (not shown), for example nonwoven polypropylene cloth, may or may not be placed between the front plate and the carobn to prevent the granules from "falling through" the perforations. The perforations or porosity must be sufficiently large and extensive so that resistance losses are not too large. A porosity or fraction of open area might be 30 percent to 60 percent, for example.

The backing plates 114 are preferably electrically conducting. The perforations or porosity may be much less than for the front plates 112, for example 3 to 10 percent is satisfactory. Solution resistance losses are not important in the backing plate and the openings must only be sufficient to allow the solution to exit uniformly from the porous structure. The backing plates 114 must be inert in the solution and to anodic polarization; materials such as aluminum, stainless steel, titanium, nickel, graphite sheet, tantalum, tungsten, and niobium are examples. The backing plates 114 might also be a nonconducting material similar to the front plates 112. For this case, an inert, electrically conducting screen or long length of inert, electrically conducting wire must be inserted into each porous carbon electrode to make electrical contact to the outside of the cell.

The backing plates 114 of both porous electrodes are held in spaced relation with the outer cell container walls by spacer blocks 118 in order to provide an open flow channel behind the electrodes 74 and 76 to the connecting cathode product outlet pipes 26 and 28 (at top) and anode product outlet pipes 56 and 58 (bottom). At the same time, the backing plates 114 are held rigidly to the container walls by the respective electrical connections for the electrode in question which connections also are threaded and bolted to act as hold downs. That is the electrical connectors 78 for the electrode 74 (left) serve as hold downs as well and electrical connectors 82 for porous electrode 76 (right) serve in the same manner.

Figure 3:
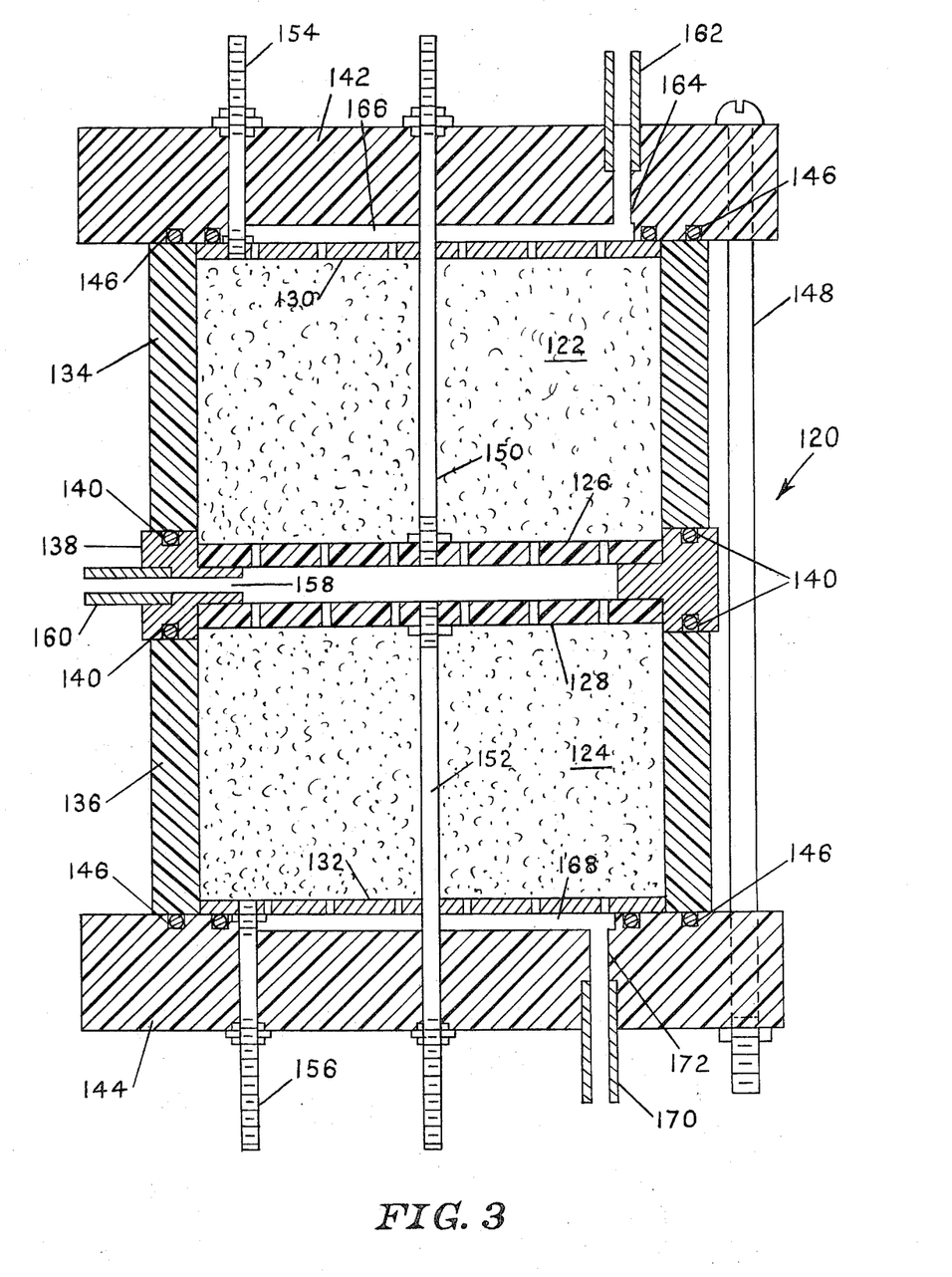
FIG. 3 is a side elevational view, in cross section, of another embodiment of an electrolytic cell which is used to carry out the objects of the present invention.

In the electrolytic cell embodiment illustrated in FIG. 2, the electrodes 74 and 76 are vertical and it is necessary to provide a separator membrane 72 to prevent mixing between the catholyte and anolyte. Mixing by natural convection may be prevented by having the cathode over the anode so that the naturally more dense anolyte has no tendency toward mixing upward into the less dense anolyte. The electrolytic cell 120 illustrated in FIG. 3 is specifically designed for such operation. General principles of operation of the cell 120 are the same as for the cell 10 of FIGS. 1 and 2. However, if the cathode is to be physically located above the anode, the entire cell 120 must be physically inverted when the electrodes are switched.

The dominant features of the cell 120 of FIG. 3, are the two porous, inert electrodes 122 and 124 located one over the other and which constitute the cathode (upper) and anode (lower), respectively. In the device illustrated, the main body of the electrodes 122 and 124 are irregularly shaped particles or flakes between 0.1 centimeter (cm.) and 0.001 cm. characteristic dimension. Of course, the composition could be the same as for the electrodes 74 and 76 of cell 10 in FIG. 3. As a matter of orientation, each porous electrode 122 and 124 has the configuration of a right circular cylinder 10.1 cm. in diameter and 6 cm. high.

Since the porous carbon of the electrodes 122 and 124 must be contained, front retaining plates 126 and 128, respectively, are provided on the lower surface of the cathode 122 and on the opposing (upper) surface of the anode 124. Also back retaining plates 130 and 132, respectively, are provided on the outer surface of the two electrodes. In order to provide for fluid flow through the electrodes 122 and 124, both front and back plates for each electrode is perforated. The front retaining plates 126 and 128 are both 0.3 cm. thick plexiglass plates drilled with 54 holes, 0.75 cm. in diameter backed by a sheet of #40 filter paper. The back retaining plates 130 and 132, which also serve as a distributed electrical connection for their associated electrode, are 0.3 cm. thick stainless steel discs containing 24 holes, 0.1 cm. in diameter. The sides of the cathode 122 and anode 124 are confined by tubular body sections 134 and 136, respectively.

The remainder of the fluid tight container for the cell 120 is made up of a central annular separating ring 138 to which the upper and lower tubular body sections 134 and 136, respectively, are sealed in fluid tight relation by "O" rings 140 and upper and lower disc shaped end pieces 142 and 144, respectively, which are also sealed to upper and lower tubular body sections 134 and 136, respectively, in fluid tight relation by "O" rings 146. For convenience, all of the outer body parts are of plexiglass. The outer body is held together by a hold down bolt and nut assembly 148 (right side of body in illustration). The front and back retaining plates 126 and 130 of the cathode 122 are held in place and the carbon bed therebetween compressed by a threaded hold down tie rod and nut assembly 150 which extends through the center of both plates and the upper disc shaped end plate 142. In essentially the same manner, the anode front and back retaining plates 128 and 132 are held in place in the assembly and the anode carbon bed is compressed. That is, a centrally located hold down threaded tie rod and nut assembly 152 extends through the center of lower end plate 144, lower steel backing plate 132, anode 124, and anode front plate 128 and holds the assembly in place.

Electrical connections are made to cathode 122 and anode 124 by means of conductive rods 154 and 156, respectively, that extend through upper and lower end plates 142 and 144 and thread into the conductive back retaining plates 130 (upper) and 132 (lower) of the respective electrodes. In this particular embodiment, only a single feed is provided and that enters an opening 158 in the central separating ring 138 through a feed pipe 160. The outlet for the purified dilute product constitutes a dilute product outlet pipe 162 which extends into an opening 164 provided in the upper end plate 142. Constriction of fluid flow through the full extent of cathode 122 is minimized by dishing the inner face of upper end plate immediately in back of the cathode back retaining plate 130 to provide an unconstricted flow channel 166. For the same reason, the inner face of the bottom end plate 144 is provided with an anode enriched product outlet pipe 170 which extends through an aperture 172 therein and communicates with the internal flow channel 168.

Fluid flow may be traced through the cell 120 starting at the feed inlet pipe 160 in the center annular ring 138. After the feed enters the cell 120, it divides into two streams. One stream goes down through the porous anode 124, becoming anolyte. Assuming that the electrical connections are made and assuming the anode is loaded with copper either due to its previous use as a cathode or by reason of loading for an original run as described in connection with the system of FIG. 1, the anolyte becomes enriched with copper. The anolyte flows out the flow channel 168 in lower end plate 144 and out the anode enriched product pipe 170 for further processing. A second stream permeates the cathode 122, thus, becoming the catholyte and being purified in the process, flows out the channel 166 in the upper end plate 142, through the opening 164 therein and out the cathode dilute product outlet pipe.

Control valves on the product catholyte and anolyte streams control the flow rates through cathode and anode in the same manner as valves 38 and 32 of FIG. 1.

Purification of the catholyte takes place in precisely the same fashion as described in connection with the system of FIGS. 1 and 2. When the cathode becomes plugged, again as evidenced by back pressure, the system must be reversed by changing the function of the electrodes 122 and 124. In this case the cell 120 must be inverted when the polarity of the potential to the electrodes is reversed in order to prevent mixing of catholyte and anolyte.

The principles of reversal of the electrical connections and the flow control by valvular adjustment have been established in connection with the system of FIG. 1. As a consequence, the external cell control system is not illustrated again. However, since results of the use of the cell 120 illustrated and described here are given, particularly in connection with FIG. 4, some comment is deemed in order. It should be understood, for example, that reference electrodes (saturated calomel cells) were placed in the feed and in the two product streams so that the potential difference measurements were made between the anode and cathode (cell control voltage VA), between the feed solution and the cathode (VDP), and between the enriched anode effluent or product and the cathode (VCP). Note, the control parameter (VDP) is as important in connection with this cell as in the system of FIG. 1.

The cell 120 was operated with a feed containing sodium sulfate as supporting electrolyte at a concentration of 0.8 M (molar) and the pH adjusted to between 2.5 and 2.6 by adding sulfuric acid. The feed temperature varied between 21 and 24 degrees centigrade and its conductivity varied between 0.16 and 0.19 mho/cm., depending on the temperature. With this feed, the data plotted on the graph of FIG. 4 were taken. The graph shows cell current in milliamperes (ma.) plotted along the axis of ordinates and the voltage between the cathode 122 and the dilute catholyte product (VDP) for three different catholyte flow rates. The numbers adjacent to the points on the curves indicate the copper concentration in the dilute catholyte effluent, expressed in ug./ml. The lowest points show results for a catholyte flow rate of 8 cubic centimeters per minute (cc./min.), and 637 ug. of Cu/ml. of feed. The flow rate for the middle curve was 12 cc./min., and a feed of 642 ug. of Cu/ml. of feed; and the upper curve was taken with a 16 cc./min. flow rate, and a feed containing 667 ug. of Cu/ml. of feed. The broken line region at the end of each of the curves indicates gassing in the cell.

Figure 4:
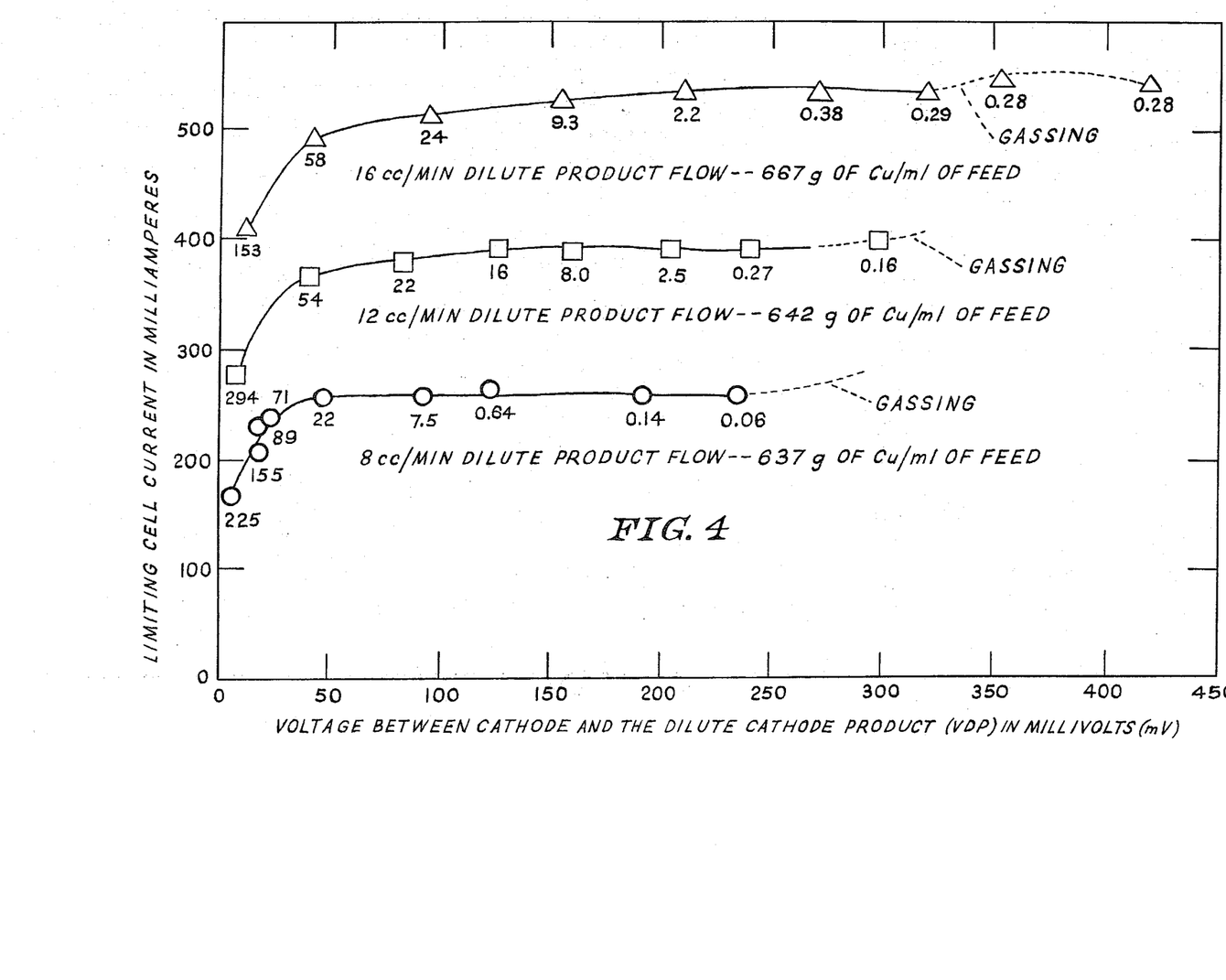
FIG. 4 is a graph illustrating results using the cell shown in FIG. 3 in accordance with the invention and specifically showing limiting cell current I in milliamperes (ma.=$10^{-3}$ amperes) plotted along the axis of ordinates against the voltage between the cell cathode and the dilute cathode product (VDP) in millivolts mv.=$10^{-3}$ volts) along the axis of abscissae for three different rates of solution flow (rates shown on the curves) through the cathode. The numbers by the data points indicate the effluent concentration of copper in micrograms per milliliter.

The current is the observed cell current. When the points become independent of VDP, the cell is operating at limiting current. Below limiting current the copper removal is less than the maximum as shown by the higher catholyte effluent concentration. For 8 cc./min., limiting current is 258 ma.; for 12 cc./min., limiting current is 390 ma.; and for 16 cc./min., limiting current is 540 ma.

The curves support the conclusions stated earlier and aid in deriving operational guidelines. For example, the larger VDP the smaller the copper ion concentration in the catholyte effluent and the converse is also true.

As previously indicated, the optimum setting for VDP is as positive as possible just short of hydrogen evolution. For example, if the feed is 667 ug., of Cu/ml. to both anode and cathode and the flow rate through the cathode is 0.2 cc./min.·cm.$^2$, the optimum operational range of VDP is between 250 and 300 mv. The cell voltage, anode to cathode, was 1.22 v. for a feed of conductivity 0.17 mho/cm. Under these conditions, the anolyte flow rate was 0.009 cc./min. cm.$^2$ and had an average effluent concentration of 0.74 molar.

It is, of course, possible to operate under gassing conditions if design arrangements are made. In fact, the cell 120 of FIG. 3, is provided with a gas vent (not shown);

however, operation is most efficient and best with VDP set just high enough that gassing does not occur.

During one run with the cell 120, a total of 97.5 liters of feed solution containing between 600 ug. of copper per ml. of solution were processed over a total of 131 hours of operating time. During the last 67 hours, 49 liters of feed were processed continuously with operator attention only for about 15 minutes twice a day. The run was terminated when a flow rate of 9.5 cc./min. was all that could be maintained. The average dilute product concentration collected during the final 67 hours was 0.55 ug. of copper per ml. of solution. During the same period, 0.54 liter of concentrated product was collected with an average concentration of 0.74 molar in copper sulfate.

While particular embodiments of the invention are shown, it will be understood that the invention is not limited to the structures or the particular sequence of operations since many modifications may be made in materials used, sequences, control means, and electrical connections as well as fluid flow arrangements. It is contemplated that the appended claims will cover any such modifications as fall within the spirit and scope of the invention.

What is claimed is:

1. A method of continuously removing a metal ion more noble than hydrogen from a first solution and transferring said ion into a more concentrated solution thereof, which comprises passing said first solution through a porous flow-through cathode electrode in which said ion is collected, passing a second solution through a porous, flow-through anode electrode containing said ion thereby concentrating the same in said second solution, and alternately reversing the polarity of said electrodes and the flow of said solutions therethrough.

2. The method of claim 1 wherein said ion is copper.

3. The method of claim 1 wherein said reversing is effected when the electrode which is the cathode becomes substantially full of said ions.

4. The method of claim 1 conducted without evolution of gas.

5. The method of claim 1 wherein the electrodes are each of carbonaceous material between foraminous plates.

6. The method of claim 2 wherein the electrode which is the cathode is located above the anode, and the electrodes are reversed when the cathode becomes substantially full of said ion.

7. The method of claim 1 wherein anolyte and catholyte feed solutions passed through said anode and cathode, respectively, are separated by a separator sheet between anode and cathode.

8. The method of claim 7 wherein said sheet is a membrane.

9. The method of claim 8 wherein said membrane is an ion exchange membrane.

10. The method of claim 9 wherein said membrane is an anion exchange membrane.

11. The method of claim 1 wherein the cathode operates substantially at limiting current.

12. A method of continuously removing a metal ion more noble than hydrogen in a solution in a first stream and concentrating said ion in a solution in a second stream which comprises providing a porous flow-through anode electrode containing said metal of said ion, providing a porous flow-through cathode electrode, continuously passing said first stream through said cathode electrode to collect said metal ion therein and form a catholyte in which said metal ion becomes depleted, continuosly passing said second stream through said anode electrode to remove said metal ion from said anode electrode and enrich the same in the anolyte passing through said anode electrode, and when said cathode electrode is substantially full of said metal ions repeatedly reversing the polarity of said electrodes and reversing the flow of said streams therethrough whereby the anolyte stream becomes increasingly enriched.

13. The method of claim 12 wherein said electrodes are arranged side by side in upright position, and providing a membrane between said electrodes to prevent convection flow between said electrodes.

References Cited

UNITED STATES PATENTS

| | | | |
|---|---|---|---|
| 1,001,466 | 8/1911 | Slaughter | 204—106 |
| 1,295,100 | 2/1919 | Bart | 204—106 |
| 1,328,666 | 1/1920 | Greenawalt | 204—106 |
| 2,865,823 | 12/1958 | Harris et al. | 204—151 |
| 3,457,152 | 7/1969 | Maloney, Jr. et. al. | 204—130 X |
| 3,616,326 | 10/1971 | Onstott | 204—180 R X |
| 3,644,146 | 2/1972 | Bergum | 204—130 X |
| 3,692,647 | 9/1972 | Chambers et al. | 204—106 X |

JOHN H. MACK, Primary Examiner

ARTHUR C. PRESCOTT, Assistant Examiner

U.S. Cl. X.R.

204—106, 130, 149